July 5, 1927. Re. 16,666

F. HEBDEN

AUTOMATIC WEIGHER

Original Filed May 7, 1917 6 Sheets-Sheet 1

INVENTOR
Frank Hebden
BY
John O. Seifert
ATTORNEY

July 5, 1927. Re. 16,666

F. HEBDEN

AUTOMATIC WEIGHER

Original Filed May 7, 1917 6 Sheets-Sheet 2

INVENTOR

Frank Hebden

BY

John A. Seifert

ATTORNEY

July 5, 1927. Re. 16,666

F. HEBDEN

AUTOMATIC WEIGHER

Original Filed May 7, 1917 6 Sheets-Sheet 3

INVENTOR
Frank Hebden
BY John O. Seifert
ATTORNEY

July 5, 1927. F. HEBDEN Re. 16,666
AUTOMATIC WEIGHER
Original Filed May 7, 1917 6 Sheets-Sheet 4
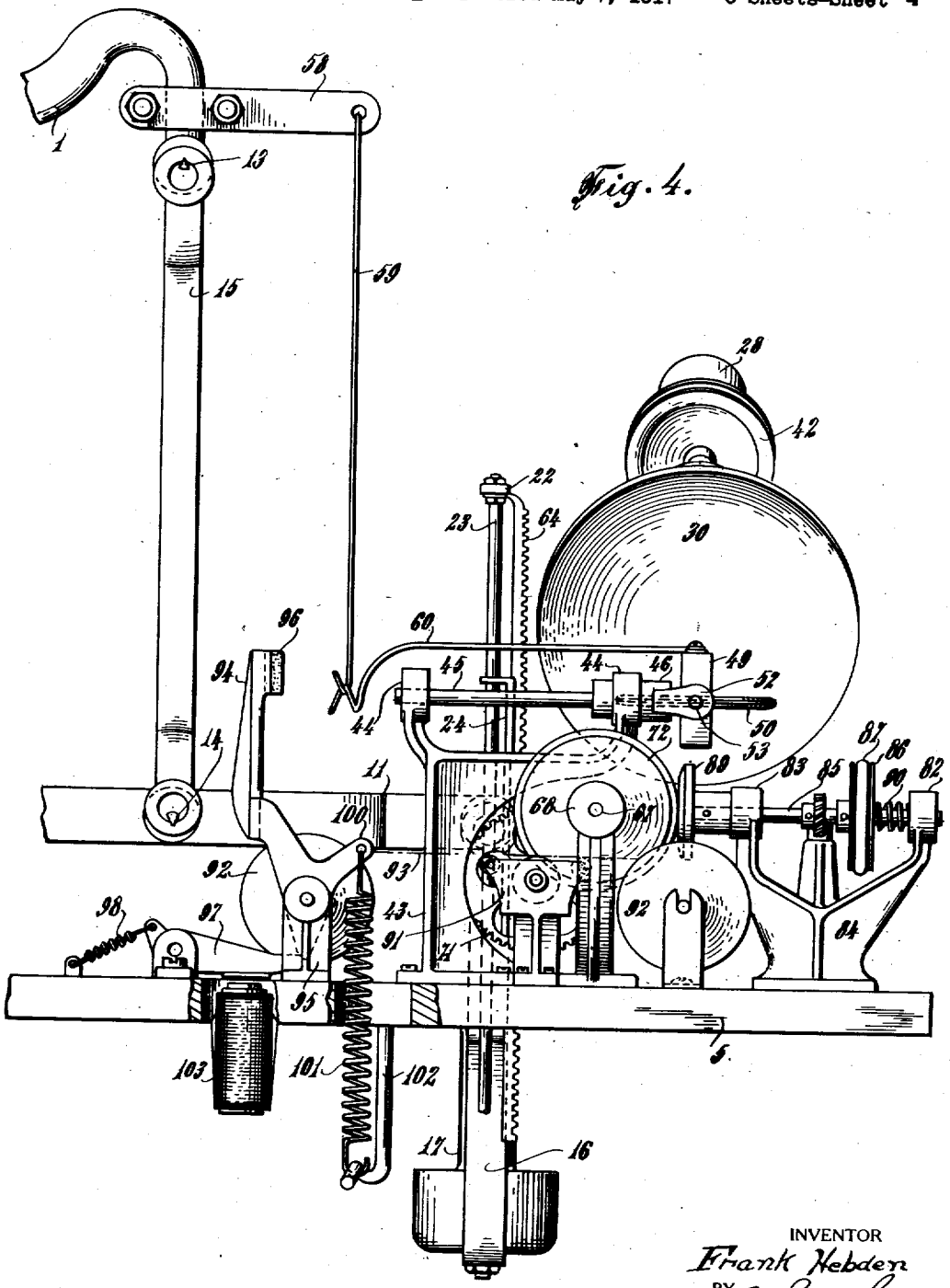
INVENTOR
Frank Hebden
BY
John O. Seifert
ATTORNEY July 5, 1927. Re. 16,666
F. HEBDEN
AUTOMATIC WEIGHER
Original Filed May 7, 1917 6 Sheets-Sheet 5
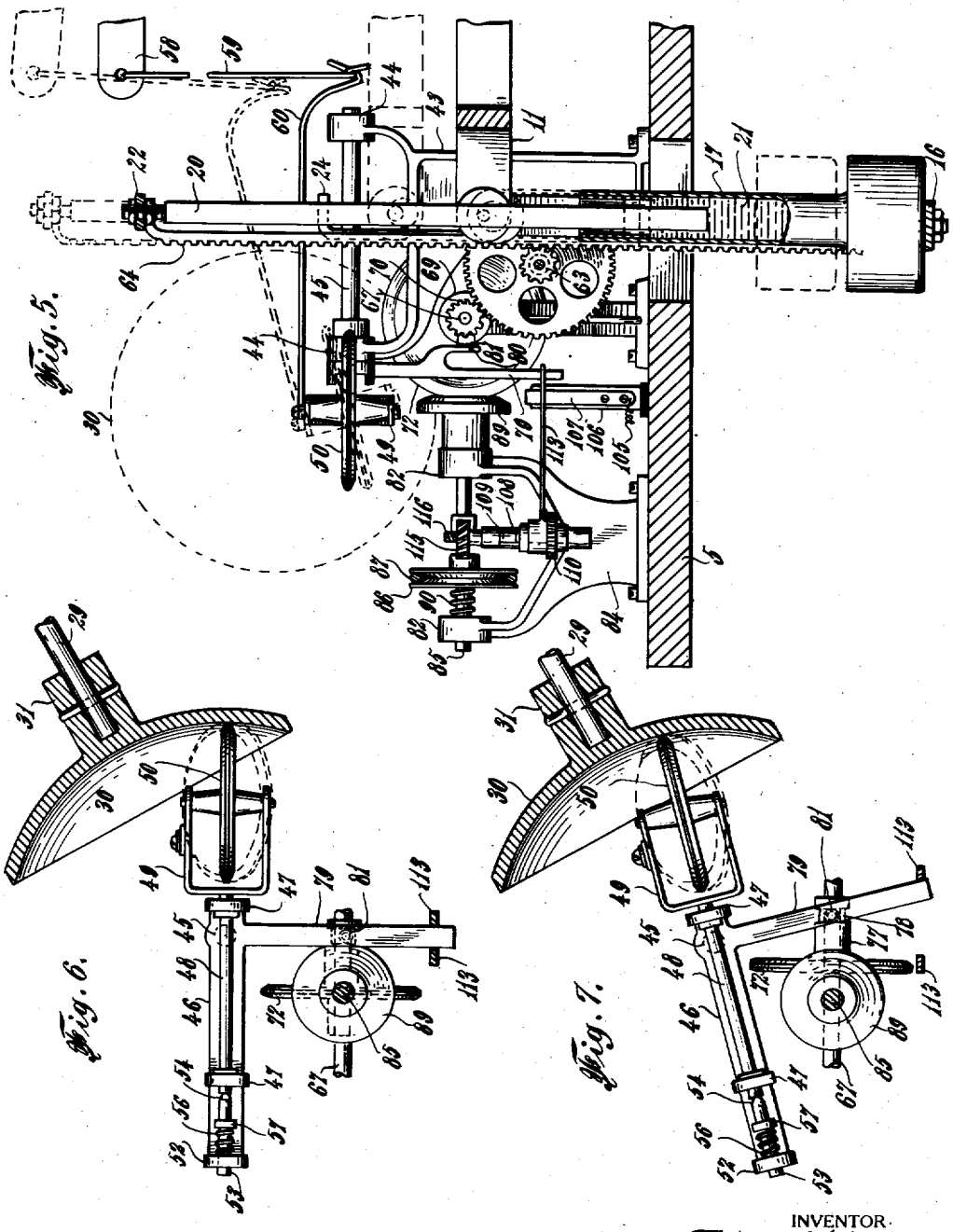
INVENTOR
Frank Hebden
BY
John O. Seifert
ATTORNEY July 5, 1927. Re. 16,666

F. HEBDEN

AUTOMATIC WEIGHER

Original Filed May 7, 1917 6 Sheets-Sheet 6

INVENTOR
Frank Hebden
BY John O. Seifert
ATTORNEY

Reissued July 5, 1927. Re. 16,666

UNITED STATES PATENT OFFICE.

FRANK HEBDEN, OF PASSAIC, NEW JERSEY, ASSIGNOR TO MERRICK SCALE MFG. COMPANY, OF PASSAIC, NEW JERSEY, A CORPORATION OF NEW JERSEY.

AUTOMATIC WEIGHER.

Original No. 1,490,270, dated April 15, 1924, Serial No. 166,804, filed May 7, 1917. Application for reissue filed April 3, 1926. Serial No. 99,655.

This invention has reference more particularly to measuring devices in which means is provided for automatically determining the measurement, and also having mechanism co-operating therewith to indicate and record the correct measurement.

The object of the invention is to provide mechanism which may readily be applied to the ordinary or standard forms of measuring devices for the purpose of automatically determining the measurement.

Another object is the provision of means which will have the effect of applying variable force or weight to a measuring part, such as the scale beam of a weighing mechanism, for the purpose of balancing the scale beam with or without a load, such means being constructed and arranged to effect a variable application of a weight counterbalancing force upon the scale beam with the friction thereof minimized to such a degree that it will not affect the accuracy of the scale or weighing mechanism whatsoever.

A further object is the provision of power driven means for operating the aforesaid balancing mechanism and means for controlling said power driven means, whereby the balancing means is adjusted thereby until a perfect and correct balance and, therefore, a correct measurement or weighing is obtained.

A further object relates to the construction of power driven load counterbalancing mechanism with controlling means therefor which is so easily operated that it does not effect the accuracy of the measuring device.

A further object is the provision of indicating and recording means and controlling means therefor constructed and arranged to prevent the taking of a reading of the measurement unless the load is accurately balanced.

This invention also has other objects and features of improvement which are clearly set forth in the following specification and shown in the accompanying drawings, and which are particularly pointed out in the claims.

In the drawings accompanying and forming a part of this specification there is shown an embodiment of the invention wherein Figure 1 is a front elevation of the scale beam and supporting parts therefor of the usual weighing mechanism and showing parts of the present invention in connection therewith.

Figure 4 is an elevational view of the mechanism shown in Figure 2 looking at the left hand end thereof.

Figure 5 is a sectional view taken on the line 5—5 of Figure 3, portions thereof being omitted to more clearly show certain parts.

Figure 6 is an elevational view of the means for controlling the adjusting means for the counterbalancing means and power driven means therefor, the same being shown in the normal neutral position.

Figure 7 is a view of the parts shown in Figure 6 showing the parts in one of its adjusted positions.

Figure 1:
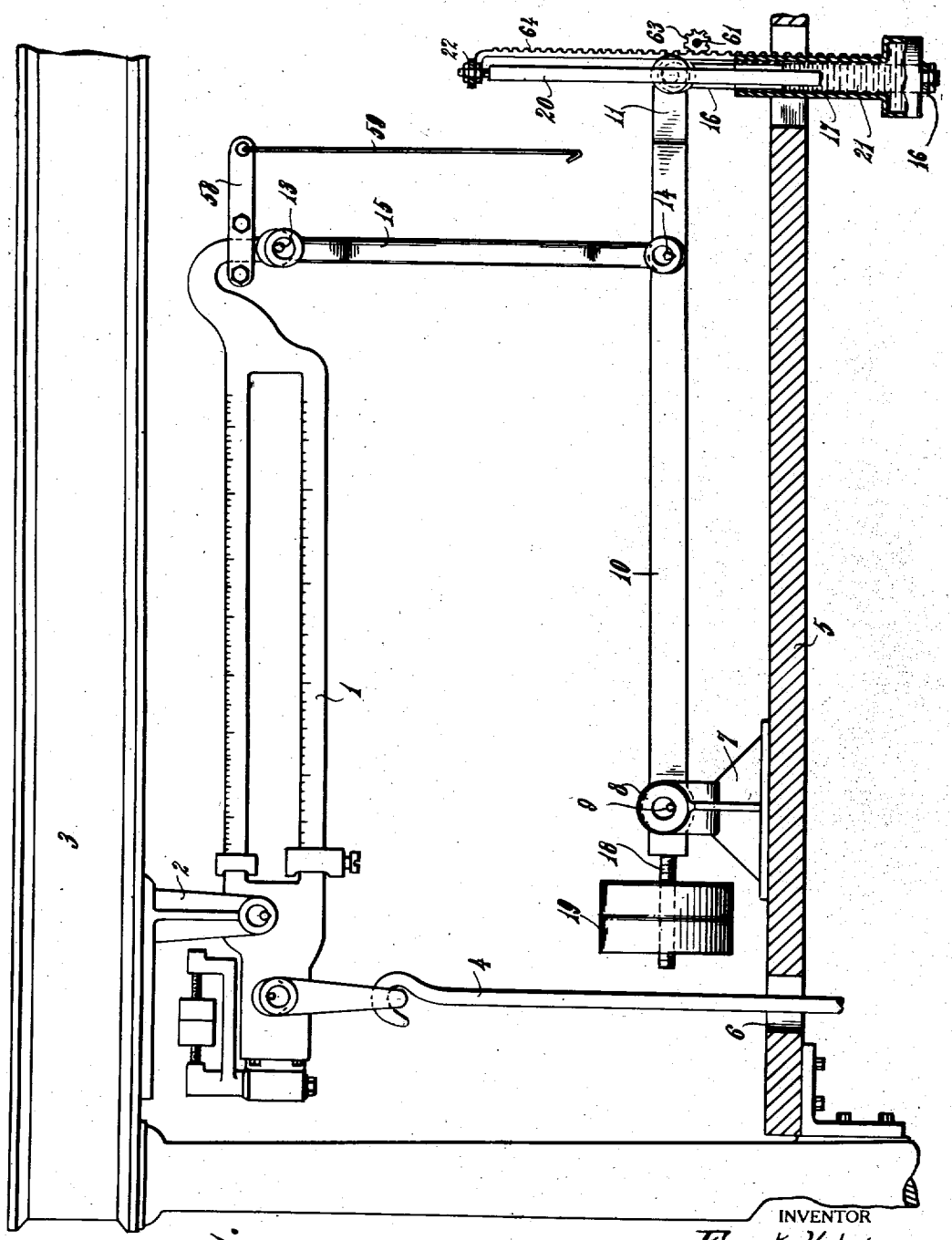
Figure 2:
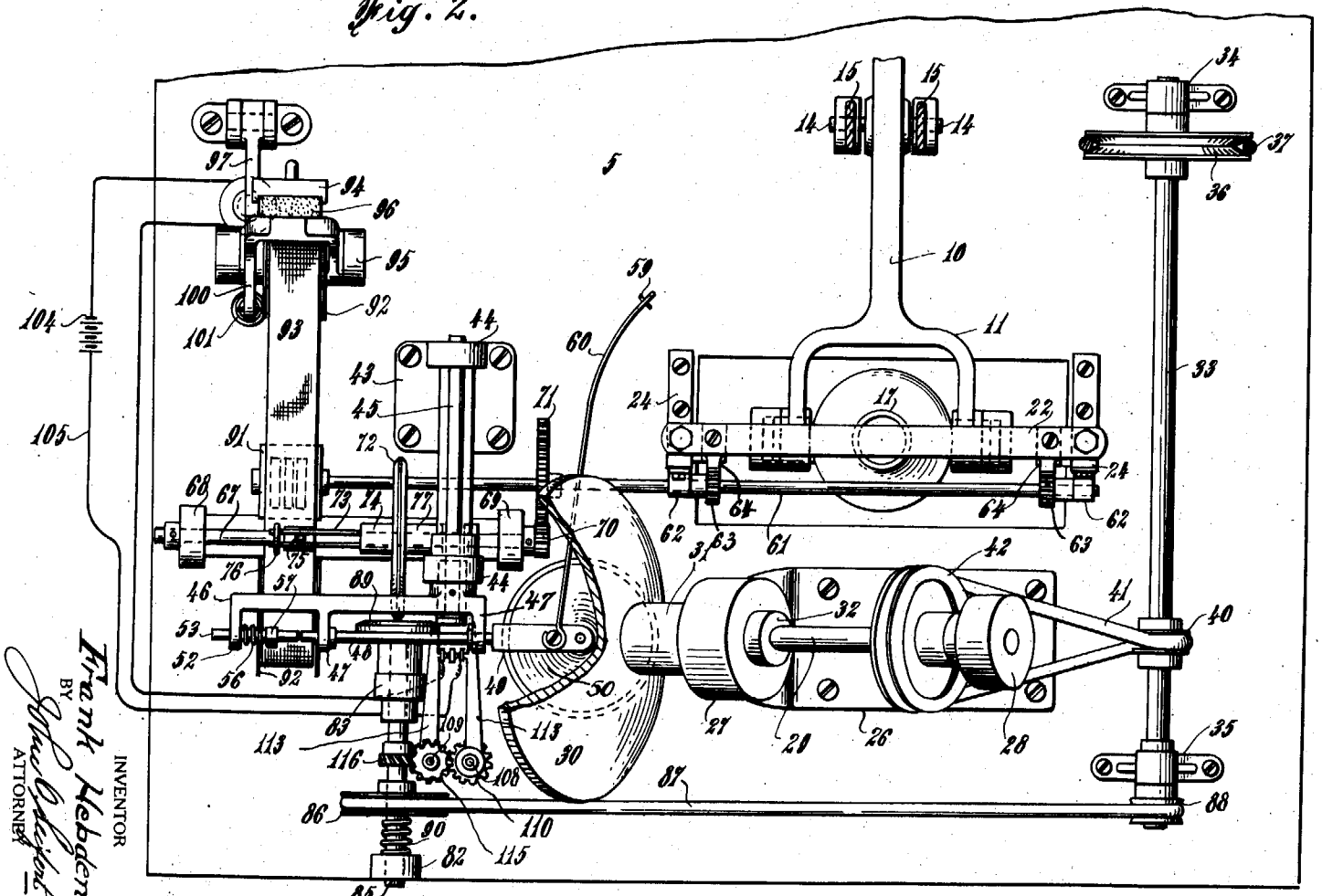
Figure 2 is a top or plan view of the automatic counterbalance adjusting and recording mechanism.

A scale beam 1, such as is usually employed in weighing scales is supported by means of a bracket 2 on a frame 3 of the weighing scale. This scale beam is connected on the weight side of its fulcrum by means of the usual rod 4 to a load receiver, such as a platform or other means whereon the load to be weighed is supported during the weighing operation. Mounted on the weighing scale frame or otherwise supported a short distance below the scale beam 1 is a frame or platform 5 wherein is mounted and supported the mechanism constituting the subjects-matter of the present application. This platform is cut away or provided with an opening 6 through which the rod 4 passes, and a short distance therefrom and directly below the scale beam 1 is a bracket 7 mounted upon the platform 5 and provided with a pair of spaced aligning bearings 8 within which are supported knife edge pivots 9 of a supplemental beam 10. This beam 10 is arranged parallel with the scale beam 1 and extends somewhat beyond the end thereof, and is formed at its outer or free end with a bifurcation or yoke 11, each arm of said yoke having a knife edge pivot support 12. The end of the scale beam 1 is provided with knife edge pivot supports 13 from which are ordinarily suspended load counterbalancing weights. A corresponding pair of knife edge pivots 14 extend oppositely from the supplemental beam 10, directly beneath the pivot supports 13 on the scale beam, and these pivot supports 13, 14 are connected by means of a link 15 which is provided at each end with a pair of suitable bearings or loops to loosely receive the said pivot supports 13 and 14, and thereby connecting the beam 10 with the scale beam 1 to participate in the movement thereof.

Suspended from the knife edge bearings 12 of the yoke 11 is a U shaped frame 16 which carries a pot or tube 17 to extend in a vertical direction so that the upper end thereof is arranged directly below the opening between the legs of the yoke 11. This pot or tube is filled to the required depth with mercury and co-operates with parts to be described hereafter for counterbalancing the weight of a load applied to the scale beam 1 through the rod 4.

At the end of the supplemental beam 10 opposite to the yoke 11 is a threaded stem or extension 18 upon which is adjustably mounted a weight 19 whereby the parts of the weighing mechanism connected with the scale beam may be brought to a perfect balance.

For the purpose of providing a variable force or weight on the scale beam 1 for counterbalancing a load applied thereto, there is provided a glass rod or plunger 20, the lower end of which dips into the mercury 21 in the mercury pot 17 and the upper end of which is secured to and supported by a cross bar 22. This cross bar 22 has secured at each end a depending vertical rod 23 which passes through an opening at the upper end of guide bars 24 and an opening at lower end of said guide bars adjacent the platform 5, whereon they are secured and supported, said guide bars being so supported and connected with the guide rods 23 to permit free longitudinal movement of the latter. The lower ends of the guide rods 23 may be provided with collars 25 to prevent accidental withdrawal of the guide rods from the supports 24.

As is apparent, the movement of the plunger rod 20 beyond the normal depth in the mercury will act as the addition of so much weight to the mercury pot and is effective to counterbalance the load applied to the scale beam. Conversely, the withdrawal of the glass plunger 20 from the mercury acts in a manner to subtract weight from the mercury pot and thereby from the scale beam.

For the purpose of providing means which is sufficiently powerful to adjust the glass plunger 20 for counterbalancing the load and also which is capable of sensitive control by means of the movement of the scale beam, the following construction is provided which forms a very essential part of my invention.

Figure 3:
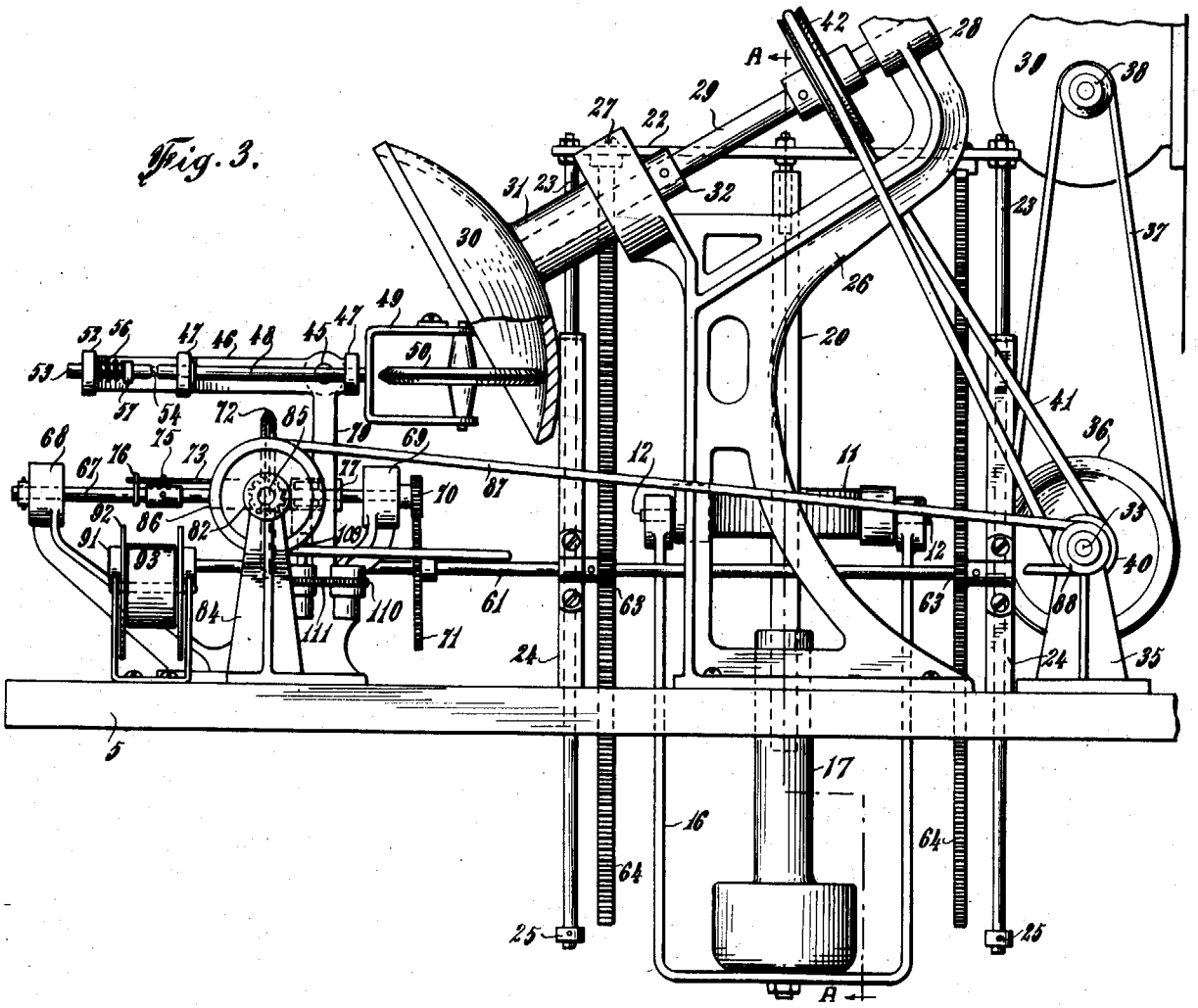
Figure 3 is an end elevation of the mechanism shown in Figure 2 looking from the bottom thereof.

Adjacent and immediately beyond the yoke end of the supplemental bar 10 and mounted on the platform is a bracket 26 provided at its upper portion with a pair of aligning bearings 27 and 28, in which a shaft 29 is journaled to extend in a plane parallel to the guide rod carrying bar 22 and inclined in an angular relation to the platform 5 as shown in Figure 3.

A traveling friction surface is driven from the shaft 29, which is in the form of a concave disk 30, mounted and fixed on the lower end of the shaft 29, with the hub 31 abutting against the bearing 27 preventing longitudinal movement of the shaft in one direction, and a collar 32 fixed on the shaft at the opposite side of said bearing prevents longitudinal movement of the shaft in the opposite direction.

Mounted on the platform 5 to extend at a right angle to the shaft 29 is a shaft 33 which is journaled in bearings 34 and 35 mounted on the platform 5. The shaft 29 is driven by a belt 37 passing around a sheave 36 fixed to said shaft and a sheave 38 fixed to the shaft 4 of the motor 39 or any other suitable power means. A sheave 40 fixed to shaft 33 is connected by a belt 41 with a sheave 42 fixed on the shaft 29 whereby said shaft and concave disk 30 is continuously driven when the motor is in operation, the relation of the driving sheaves being determined so as to rotate the concave disk 30 at the proper speed to properly operate the mechanism hereafter described.

Figure 8:
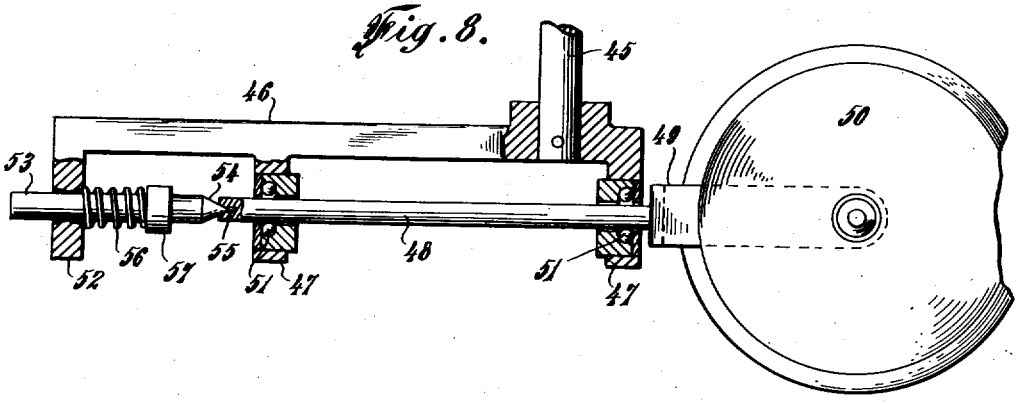
Figure 8 is an enlarged sectional view of the controlling mechanism for the adjusting means of counterbalancing means showing the manner of mounting the controller wheel of said mechanism.

A bracket 43 mounted upon the platform 5 in front of the rotary disk 30 is arranged with a pair of aligned bearing lugs 44 in which is rotatably supported a shaft 45 having a frame 46 fixed at the end thereof immediately in front of the disk 30 which frame, by reason of its support upon the shaft 45, is adapted to be swung with the shaft 45 about the axis thereof. The relation of the shaft with the disk 30 is such that the axis of the shaft 45 passes through the center from which all points of the convex surface of the disk 30 are equi-distant. The frame 46 is elongated in a direction at a right angle to the shaft 45 and provided with two aligned bearings 47 in which is rotatably mounted a shaft 48. This shaft at its end adjacent the disk has a bifurcated member 49 fixed thereto in the legs of which member to engage between the same is rotatably mounted a disk or wheel 50, the periphery of which is beveled as shown to provide a narrow peripheral or bearing edge which engages the inner surface of the concave disk 30. It is necessary for the sensitive operation of the weighing mechanism that the shaft 48 shall turn freely within the bearings 47 and for this purpose said bearings are provided with ball-bearings 51 as shown in Figure 8 to engage the shaft. At the end of the shaft 48 opposite to the wheel 50 the frame 46 is arranged with a lug 52 having an opening therethrough in alignment with shaft 48. An end thrust pin 53 having a tapered end 54 to engage a recess 55 in the end of the shaft 48 is engaged in the opening of lug 52 to extend through said opening with a spring 56 coiled about said pin and confined between the lug 52 and an annular shoulder 57 on the pin whereby said pin is urged at a uniform tension into engagement with the end of the shaft 48, said tension being sufficient to act through the shaft 48 and support 49 to urge the wheel 50 into light frictional contact with the concave disk 30. By the pivotal mounting of the frame 46 and shaft 45 the wheel 50 may be swung to and from the axis of the revolving disk 30, the relation of the pivotal supports 44 to the disk 30 being such that the wheel 50 will swing in an arc concentric with the surface of the disk 30 and is at all times held in frictional engagement with the disk 30 by means of the end thrust pin 53.

As is apparent from the foregoing, the disk 30 is continuously driven by the motor 39 and the wheel 50 through its constant frictional engagement with the inner surface of the disk 30 is likewise continuously driven. As long as the wheel 50 is in a position to travel in a plane exactly at a right angle to a plane passing through the axes of the shafts 29 and 48 the wheel 50 will remain constantly at the same distance from the axis of the revolving disk 30, and will travel in a circular path on the inner surface of the disk. However, should the support 48, 49 of the wheel 50 be shifted in its pivotal supporting bearings 47 so that it does not travel in a direction absolutely at a right angle with a plane passing through the axes of the shafts 29 and 48, that is the direction of travel changed in angular relation to disk 30, the revolution of the disk 30 will cause the wheel 50 to travel in a spiral path on the inner face of the disk which will direct said wheel 50 toward or from the axis of the disk depending on the direction in which the wheel is tilted and this movement of the wheel will swing the frame 46 and shaft 45 in its pivotal support in the bearings 44.

The frame 49 and wheel 50 are mounted in ball bearings and the wheel 50 being of less diameter than the diameter of the concave surface of the disk 30 has a bearing on the said disk at a point which is on the axial line of the shaft 48 which enables the frame 49 and wheel thereon to be very easily tilted from the normal position shown in Figure 6 to that, for instance, shown in Figure 7, and such tilting of this structure from the normal position, which, as previously explained, causes the wheel 50 to approach nearer to or depart farther from the axis of the revolving disk 30, is utilized to operate the mechanism for adjusting the plunger rod 20 to a greater or lesser degree into and out of the mercury in pot 17 and thereby exerting a force upon the scale beam to counterbalance the load.

To control the tilting of the wheel carrying frame 49, a bar 58 is clamped or otherwise secured to the end of the scale beam 1 to move therewith and this bar has a rod 59 suspended therefrom, said rod having a hook at its lower end to co-operate with another rod 60 connected at one end to the tiltable frame 49 with the opposite end suitably bent and arranged with a hooked terminal which rests or is supported in the hook of rod 59, the relation of the said rods being such that when the scale beam is balanced the rod 60 through its connection with the rod 59 will hold the frame 49 in the normal position shown in full lines in Figure 5, and in such position, as hereinbefore set forth the wheel 50 occupies a position to travel in a direction at a right angle to a plane passing through the axes of the shafts 29 and 48, and, therefore, as the disk 30 revolves the wheel 50 travels in a circular path on the inner surface of the disk 30 and remains at all times at the same distance from the axis of said disk. This holds the supporting frame in a stationary or inoperative position as shown in Figure 6.

However, should the scale beam 1 be moved to either side of its balanced position, the rod 59 through its connection with the rod 60 will tilt the frame 49 and wheel 50 thereby changing the direction of travel of the wheel 50 relative to the plane extending through the axes of the shafts 29 and 48, as shown in dotted lines in Figure 5, and the revolution of the disk 30 will cause the wheel 50 to travel in a spiral path on disk 30 toward the center thereof or outwardly from the disk axis depending on the movement of the scale beam above or below its position of balance, as the case may be.

Figure 9:
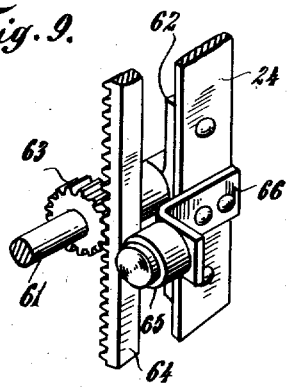
Figure 9 is an enlarged perspective view of a rack and pinion mechanism for operating the counterbalancing means and the means for holding said rack and pinion mechanism in operative relation.

As is obvious, when the scale beam 1 is moved by a load applied thereto above its balanced position, it is necessary for the plunger rod 20 to be submerged to a greater depth in the mercury pot 17 to exert an additional pressure or increased force on the scale beam to balance the load, and conversely, if the scale beam is moved below its balanced position, it is necessary that the plunger rod 20 be withdrawn somewhat from the mercury. For imparting this adjustment to the plunger 20 there is provided a shaft 61 which is journaled in bearings 62 on the guide bars 24 to extend parallel to and slightly above the platform 5, said shaft having pinions 63 thereon at the inner side of and adjacent each of the bearings. Racks 64 are secured at one end to the cross bar 22 to depend therefrom in position to be engaged by the pinions 63, and extend for substantially the length of the guide rods 23 so that said pinions 63, by their engagement with the racks, are capable of raising and lowering the cross bar 22 and the plunger rod connected thereto. The racks 64 are held in meshing relation with the pinion 63 by idler rollers 65 bearing against the rear faces thereof rotatably mounted on brackets 66 secured to the guide bars 24. (Figure 9.)

The shaft 61 is rotated to adjust the plunger rod 20 from a shaft 67 journaled in bearings 68 and 69 to extend in parallel relation to the shaft 61, a spur gear 70 fixed thereon meshing with a spur gear 71 on the shaft 61, the ratio of said spur gears being such that the shaft 61 is operated at a predetermined lower speed relative to the shaft 67. A friction disk 72, similar to the disk 50, previously described, having the edge beveled to provide a narrow bearing periphery is slidably mounted on said shaft 67, and adapted to have adjustment longitudinally thereof, but is keyed to the shaft to rotate therewith by parallel rods 73 which are secured at one end in the hub 74 of disk 72 to extend parallel with the shaft and at opposite sides of a small roller 75 on a stud which is secured to and extends radially from shaft 67. The outer ends of the rods 73 are held together by engaging in perforations in disk 76 or otherwise as desired. By this arrangement the disk 72 will rotate with the shaft and at the same time permits the wheel being moved lengthwise thereof with comparative ease. At the side of the wheel 72 opposite the hub 74 is an extended hub member 77 having an annular groove 78 therein (Figure 7). Depending from the frame 46 is a lever arm 79 which has intermediate of its length an offset extension 80 (Figure 5) upon which is mounted a roller 81 which fits within the annular groove 78, so that the swinging of the lever 79 with the movement of the frame 46 causes the disk 72 to slide longitudinally on the shaft 67, the normal position of the wheel 72 being as shown in Figure 6 with the wheel 50 traveling in a circular path about the inner face of the disk 30.

When the wheel 50 travels in a spiral path on disk 30 toward the center thereof the lever 79 draws the wheel 72 to the right of the normal position, as shown in Figure 7, and when the wheel is tilted to cause it to travel in an opposite direction on the disk 30 the lever moves the wheel 72 to the opposite side of its normal position.

Mounted in bearings 82 and 83 of a bracket 84 which is secured to the platform 5, and to extend at right angles to the shaft 67 is a shaft 85 whose axis intersects the axis of the shaft 67 and is arranged in the same plane with the bearing edge of the wheel when in its normal or neutral position. This shaft has a sheave 86 fixed thereon which is driven by belt 87 from a sheave 88 on the shaft 33. As disk 89 is fixed on the end of shaft 85 in position to have contact with the wheel 72, and said disk is held against the bearing edge of wheel 72 at a uniform pressure by a spring 90 confined between the bearing 82 and the sheave 86.

The disk 89 is continuously driven when the weighing mechanism is in operation and the wheel 72 normally bears against the center of the disk as shown in Figures 2, 3, 6 and 8 in which position the wheel is stationary as no movement can, in such position, be imparted to it by the revolving movement of the disk 89. Should the wheel 72 be moved to one side or the other of the axis of the disk 89 by the lever 79 it will be caused to rotate by the revolving disk 89, and through its shaft 67 and the gears 70 and 71 will rotate shaft 61 to operate and move the plunger rod 20 into or out of the mercury in pot 17. The adjustment of the wheel 72 from the normal inoperative position shown in Figure 6 in either direction therefrom is controlled by the swinging frame 46 which in turn is controlled by the tilting of the frame 49 and wheel 50, which in turn are controlled by the movement of the scale beam through the connection thereof by the rods 59 and 60 and the bar 58, the relation between the parts being such that when the scale beam is raised above the balanced position, the wheel 50 will be shifted relative to the disk 30 to tilt the frame 46 to position wheel 72 relative to disk 89 to actuate shaft 61 to move the plunger rod 20 to a greater extent into the mercury 21 in pot 17, and conversely, when the scale beam is moved below the balanced position, the wheel 50 is shifted in the opposite direction so as to operate the shaft 61 and mechanism connected thereto to raise the plunger rod from the mercury. In either case the plunger rod is moved in the required direction to balance the load and return the scale beam to the balanced position, and as the scale beam returns to the balanced position the tilted position of the frame 49 is correspondingly varied by means of its connection with the scale beam through the rods 59 and 60 to return the wheel 50 to its normal position as shown in Figure 6, with the lever 79 holding the wheel 72 in the inoperative position, all the parts co-operating in such a way that as the scale beam gradually approaches its balanced position, the operation of the parts and the movement of the plunger rod 20 is gradually retarded and ceases as soon as a perfect balance is obtained.

The degree to which the plunger rod 20 is engaged in the mercury in the pot 17 determines the weight of the load on the scales, and as this is adjusted by the movement of the shaft 61 and the pinion 63 thereon through their connection with the racks 64 the weight of the load can be determined by the amount of movement of the shaft 61 from the normal position. For the purpose or recording the weight of the load there is provided a recording mechanism in the form of a counter 91 which is operated from the shaft 61 proportional to the movement of the plunger to advance the digit wheels of the counter and indicate the correct weight of the load on the scale. A detailed construction of this counter is not shown as it, in itself, forms no part of the present invention and any suitable or commonly known counter may be used which will accomplish this result. The recording mechanism is preferably of a type whereby the weight as determined can be printed on a card or otherwise, and for this purpose I provide the spools 92 which are adapted to carry an ordinary typewriter ribbon 93 over the face of the counter. A hammer 94 is pivotally mounted in a bracket 95 on the platform 5 in such position that it may be swung downwardly to cause the hammer face 96 to strike the typewriter ribbon directly above the alined digits of the digit wheels of the counter. By placing a card or paper on the typewriter ribbon above the counter and depressing the hammer to strike thereagainst a printed record of the determined weight of a load weighed may be secured.

Means are provided to automatically actuate the hammer to make an impression from the recording mechanism of the weight of a load, and to control such means so that the hammer will operate only when the scale beam is in the balanced position. For this purpose I provide a pivoted trip lever 97 adjacent the lower end of the hammer lever 94 normally urged by a spring 98 into engagement with a notch 99 (Figure 10) in the lower end of the hammer lever 94, thereby holding said lever in the raised position preparatory to striking against the recording mechanism to make an impression therefrom of the weight of a load weighed. The hammer lever 94 is provided with an arm 100 to which is connected one end of a spring 101 the other end being connected to the hooked end of an arm 102 extending below the frame 5, so that when trip lever 97 is released from the notch 99 of the hammer lever 94, said hammer lever is moved by said spring 101 to strike the hammer against the recording mechanism with a blow of sufficient force to make an impression therefrom and thereby record the weight of the load.

The actuating of the trip lever 97 is controlled by electrically operated means, said means comprising a magnet 103 which is positioned below and to which the trip lever 97 serves as armature, and through the attractive force of which magnet the trip lever 97 is released from the hammer lever 94. The magnet is connected in a circuit 105 with a source of electricity, such as a battery 104. Mounted upon the frame 5 adjacent the lower end of the lever 79 is an insulated support 106, at each side of which, and insulated therefrom, are arranged spring contact members 107 each of which is connected in the circuit 105 so that when they are both placed against the central contact member 106 the circuit is closed and the magnet energized and thereby the magnet withdraws the trip lever 97 from its engagement in the notch 99 of the hammer lever 94 and permits the operation of the hammer lever by the spring 101.

Figure 10:
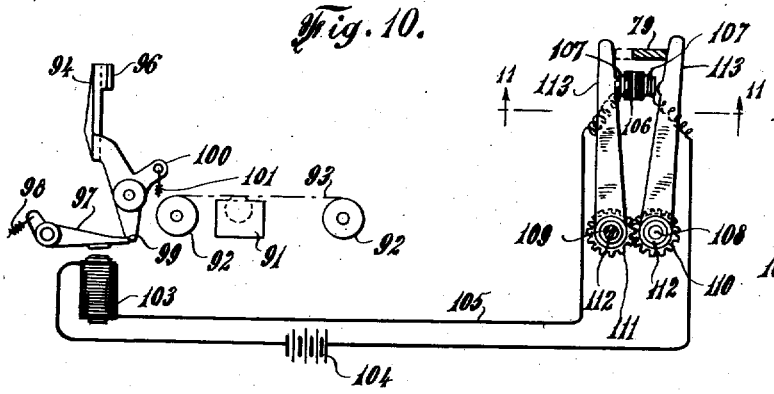
Figure 10 is a diagrammatic view of the electrically operated controlling means which prevents the recording of the weight of a load except when the load is not perfectly balanced and showing the electrical hook up thereof with a source of electricity.
Figure 11:
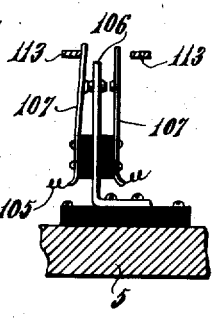
Figure 11 is a detail view of a circuit closing means interposed in the electrical hook up of the means shown in Figure 10.
Figure 12:
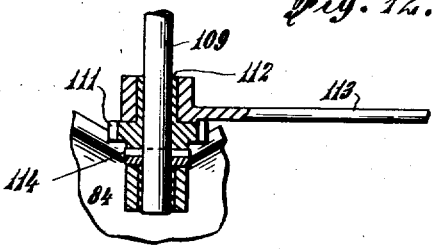
Figure 12 is a sectional view to show the mounting of a lever forming a part of the electrical control means shown in Figure 10.

A pair of parallel vertical shafts 108 and 109 are rotatably supported in an extended part of the bracket 84 said shafts having a pair of meshing spur gears 110 and 111 thereon. On the extended hubs 112 of the gears (Figure 12) are loosely mounted a pair of parallelly extending levers 113, the free ends of which embrace the upper free ends of the contact springs 107, as shown in Figures 10 and 11, and also engage at opposite sides of the lever arm 79 of frame 46 (Figure 6). The gear 111 is fixed to shaft 109 (Figure 12) as by means of a pin 114 or otherwise, a gear 115 at the upper end of said shaft meshing with a gear 116 on the constantly driven shaft 85 and imparts thereby movement to the gears 110 and 111, which, through their loose frictional connection with the hubs of the levers 113 tend to swing the outer ends of the said levers toward each other and move the spring contacts 107 into contact with the common contact member 106 and close the circuit. To prevent such action and consequent closing of the circuit, except when the scale beam is in perfect balance, the lower end of the lever 79 is positioned to swing between the extreme outer ends of the levers 113 and constructed so that the levers cannot approach and close the circuit except when the lever 79 is at rest, exactly in the center or normal position. As hereinbefore set forth movement of the scale beam out of equilibrium, tilts the frame and wheel 50 and causes a swinging of the frame 46 and shaft 45 and consequently a swinging movement of the lever 79, and it is impossible for the frame to come to rest until the scale beam is in equilibrium and ceases to move the rods 59 and 60. The rotation of the gears 115 and 116 is timed so that the levers 113 swing more slowly than the lever 79 and consequently the swinging of the lever 79 keeps pushing the levers 113 away from the contact members 107 and does not permit both of the levers to engage said contact members simultaneously which is necessary in order to close the circuit until the lever 79 has ceased to oscillate and comes to rest midway between the ends of the levers 113.

As soon as the lever 79 comes to rest the contact is automatically made, the trip lever 97 released by the closing of the circuit and energizing of the magnet 103 and impression making movement is imparted to lever 94 to make a record of the weight of the load. After the load is removed the hammer lever 94 is manually raised and the mechanism is then in position to weigh and record a successive load.

While I have shown the controlling means herein in connection with a weighing scale, I contemplate using it in connection with any measuring device or for any purpose wherein a sensitive control of operating parts is required.

Having thus described my invention, I claim:

1. In a measuring mechanism, the combination of adjustable means for determining the measurement, driven means for operating said adjustable means, a drive disc having a friction drive surface, a member pivoted adjacent the said friction surface, for controlling the said driven means, an idler wheel on the said pivoted member having a frictional engagement with the said rotary disc and controlling means for changing the position of the said idler so as to cause it to travel spirally on the face of the disc and thereby oscillate the pivoted member for controlling the said driven means.

2. The combination with measuring mechanism of adjusting means for determining the measurement, friction drive means for operating the said adjusting means, a driven concave disc, an oscillating member for controlling the said friction drive means, an idler on the said oscillating member having a frictional engagement with the concave surface of the said driven disc and means controlled by the measuring mechanism for varying the position of the idler, whereby it is operated by the rotary disc to oscillate the said member.

3. In combination, a scale beam, fluid controlled mechanism for counterbalancing the scale beam, and connected therewith, means for automatically adjusting said fluid control mechanism controlled by the movement of the scale beam, weight recording mechanism and means co-acting with said fluid control actuating means for operating said recording mechanism.

4. In a scale, in combination, a scale beam, fluid control means co-operating with said scale beam, to counterbalance the latter, means under control of the scale beam for automatic adjustment of said fluid control means, to produce variable resistance against movement of the scale beam, including power means and connections operating said fluid control mechanism, and recording means co-acting with said actuating means for the fluid control mechanism.

5. In a scale, in combination, a scale beam, a fluid container, connected with the scale beam and a displacement member adjustable within the fluid in said container for counterbalancing the weight of the load, power driven means, recording mechanism, means connecting said recording mechanism with the power-operated member, and means actuated by the movement of the scale beam to cause the counterbalancing mechanism to function and the recording mechanism to be operated.

6. In a scale, in combination, a scale beam, a receptacle adapted to contain a fluid, a displacement member connected with the scale beam and depending within the receptacle, a recording mechanism, a driven member, connections from the driven member connected respectively with said receptacle and the recording mechanism for operating the same, but normally inactive, and means actuated by the movement of the scale beam for causing said connecting mechanisms respectively to the displacement member and recording mechanism to be operated from the driven member.

7. In weighing mechanism, a scale beam, and means operative when the beam is moved out of equilibrium to exert a force thereon to return the beam to position of balance including traveling contacting friction surfaces the direction of travel of one of which surfaces is adapted to be changed in angular relation to the direction of travel of the other surface.

8. In weighing mechanism, a load support, and means operative when the weighing mechanism is moved out of equilibrium by a load applied to or removed from the load support to return the weighing mechanism to position of equilibrium including traveling contacting friction surfaces the direction of travel of one of which surfaces is adapted to be changed in angular relation to the direction of travel of the other surface when the weighing mechanism is moved out of equilibrium.

9. In weighing mechanism as claimed in claim 8, wherein the load support embodies a scale beam and the traveling friction surfaces comprise a pair of contacting rotatable friction surfaces one of which is rotatable in a fixed plane and the other of which surfaces is adjustable through the deflection of the scale beam to change the direction of travel thereof in angular relation to the direction of travel of the other surface.

10. In weighing mechanism, a scale beam arranged with load supporting means, adjustable means operative to exert a variable force upon the scale beam to counterbalance a load supported thereby, power operated means to actuate said force adjusting means, and means operative through the deflecting movements of the beam to control said power operated means including a pair of traveling contacting friction surfaces the direction of travel of one of which surfaces is adapted to be changed through the deflection of the scale beam in angular relation to the direction of travel of the other surface.

11. In weighing mechanism, load supporting means, adjustable means to exert a variable force upon the load supporting means to counterbalance a load supported thereby, and continuously operating means to co-operate with said variable force adjusting means to retain the load supporting means in equilibrium with no load applied thereto and automatically operative to adjust said force applying means when the weighing mechanism is moved out of equilibrium to underload or overload position and bring the weighing mechanism into equilibrium.

12. In weighing mechanism, a beam arranged with load supporting means, adjustable means to apply a force to the beam to counterbalance the force of the load supported by the beam and relieve the beam of said force and the return thereof to balance when the load is removed, means to adjust said force applying means, power means, and means controlled by the beam to operatively connect the counterbalancing force applying means to and disconnect the same from the power means, comprising a traveling friction surface and a disk to frictionally contact with and driven by said friction surface and the direction of travel thereof adapted to be changed in angular relation to the direction of travel of the friction surface by the deflection of the beam to overload or underload position.

13. In weighing mechanism as claimed in claim 12, the provision of means to record the weight of successive weighings operative from the means to adjust the counterbalancing means.

14. Weighing mechanism as claimed in claim 12 wherein the connection between the adjusting means for the counterbalancing means with the power means comprises a friction disk and a friction wheel to have peripheral contact with and adjustment axially and transversely of the face of the friction disk.

15. Weighing mechanism as claimed in claim 12, wherein the connection between the adjusting means for the counterbalancing means with the power means comprises a friction disk and a friction wheel to have peripheral contact with an axial adjustment transversely of the face of the friction disk, and the first disk which frictionally contacts with the traveling friction surface and the direction of travel of which is adapted to be changed in angular relation to the travel of said friction surface by the deflection of the beam having a connection with the friction wheel of the connection means of the counterbalancing means with the power means whereby changes in the direction of travel of said first disk effects adjustment of said friction wheel.

16. In weighing mechanism as claimed in claim 12, the provision of means to record the weight of successive weighings operative from the adjusting means for the counterbalancing means, and means to make an impression from the recording means.

17. In weighing mechanism as claimed in claim 12, the provision of means to record the weight of successive weighings operative from the adjusting means for the counterbalancing means, a pivotally supported hammer for striking against and making an impression from said recording means and yieldingly urged toward the recording means, a latch for normally holding said hammer in inactive position, and an electromagnet for releasing the latch from the hammer connected in an electric circuit rendered inactive from the weighing mechanism when it is moved out of equilibrium by a load applied thereto and rendered active when the weighing mechanism is brought into perfect balance.

18. In weighing mechanism as claimed in claim 12, the provision of means to record the weight of successive weighings operative from the adjusting means for the counterbalancing means, a pivotally supported hammer for striking against and making an impression from said recording means and yieldingly urged toward the recording means, a latch for normally holding said hammer in inactive position, and an electromagnet for releasing the latch from the hammer connected in an electric circuit rendered inactive from the weighing mechanism when it is moved out of equilibrium by a load applied thereto and rendered active when the weighing mechanism is brought into perfect balance, comprising circuit closing means normally urged to circuit closing position, and said circuit closing means moved to circuit opening position by the means for connecting the first disk with the friction wheel to effect adjustment of the latter.

19. In weighing mechanism, a beam arranged with load supporting means, and means to apply a force to the beam to oppose and equalize the force of the load supported by the beam and relieve the beam of said force and return the same to balance when the load is removed, comprising a liquid carrying receptacle, and a plunger movable into and out of the liquid in the receptacle to variably displace the liquid in the receptacle, and one of which is connected to and adapted to participate in the movement of the beam and the other to have movement independent of the beam.

20. In weighing mechanism as claimed in claim 19, wherein the receptacle has connection with the beam to participate in the movement thereof and the plunger is supported independent of the beam to have movement into and out of the liquid in the receptacle.

21. Weighing mechanism as claimed in claim 19, wherein the receptacle has connection with the beam to participate in the movement thereof and the plunger is carried by an adjustable support independent of the beam to have movement into and out of the liquid in the receptacle, comprising racks, a shaft having pinions thereon meshing with the racks, power means, and a driving connection between said power means and pinion carrying shaft to rotate the latter in opposite directions.

22. Weighing mechanism as claimed in claim 19, wherein the receptacle has connection with the beam to participate in the movement thereof and the plunger is carried by an adjustable support independent of the beam to have movement into and out of the liquid in the receptacle, comprising racks, a shaft having pinions thereon meshing with the racks, power means, a driving connection between said power means and pinion carrying shaft to rotate the latter in opposite directions, and means operative from the movement of the beam to control the connection of the pinion carrying shaft with the power means.

23. Weighing mechanism as claimed in claim 19, wherein the receptacle has connection with the beam to participate in the movement thereof and the plunger is carried by an adjustable support independent of the beam to have movement into and out of the liquid in the receptacle, comprising racks, a shaft having pinions thereon meshing with the racks, power means, a driving connection between said power means and pinion carrying shaft to rotate the latter in opposite directions, and means to control the connection of the pinion carrying shaft with the power means including a traveling friction surface and a friction disk to contact with said surface, and the direction of travel of said disk adapted to be changed in angular relation to the direction of travel of the friction surface effected by deflection of the beam.

24. In weighing mechanism, adjustable counterpoise to bring and maintain the weighing mechanism in equilibrium, means to adjust said counterpoise, power means, and means to apply said power means to the counterpoise adjusting means when the weighing mechanism is moved out of equilibrium including a travelling friction surface, a disk to have frictional contact with said surface and travel in the same plane as said surface with the weighing mechanism in equilibrium, and the direction of travel of said disk adapted to be changed in angular relation to the direction of travel of the friction surface when the weighing mechanism is moved out of equilibrium, and a connection between said disk and the counterpoise adjusting means operative from the disk when the direction of travel thereof is changed to apply the power means to the counterpoise adjusting means.

25. In weighing mechanism, as claimed in claim 24, means to make a record of successive weighings operative from the counterpoise adjusting means to advance said recording means proportional with the adjustment of the counterpoise.

26. In weighing mechanism, as claimed in claim 24, means to make a record of successive weighings operative from the counterpoise adjusting means, and means to make an impression from said recording means rendered inactive by the weighing mechanism when moved out of equilibrium and rendered active when the weighing mechanism is brought into perfect balance.

FRANK HEBDEN.